Feb. 16, 1932.  L. P. MOOERS  1,845,318
POWER TRANSMITTING MECHANISM FOR MOTOR VEHICLES
Filed Aug. 24, 1925  5 Sheets-Sheet 1

Fig.1.

Louis P Mooers
Inventor

Fig. 3.

Patented Feb. 16, 1932

1,845,318

UNITED STATES PATENT OFFICE

LOUIS P. MOOERS, OF CLEVELAND, OHIO, ASSIGNOR TO ARTHUR J. PERFLER, OF CLEVELAND, OHIO

POWER TRANSMITTING MECHANISM FOR MOTOR VEHICLES

Application filed August 24, 1925. Serial No. 52,111.

This invention relates to motor vehicles in which there are a plurality of driven axles, and more particularly to mechanism for transmitting power from a motor to the driven axle sections of the axles.

An object of my invention is to provide a strong, relatively simple power transmitting mechanism for a plurality of driven axles wherein the elements are associated so that they can be readily assembled, removed and adjusted.

A further object of my invention is to provide power transmitting mechanism comprising self contained, compact unit assemblies which can be readily associated with or removed from operative relation with a plurality of axles.

Another object of the invention is to provide power transmitting mechanism in which the elements are arranged and designed to drive a plurality of axles from a motor at reduced speed and with a minimum friction loss.

Another object of my invention is to provide a power transmitting mechanism which is formed of unitary assemblies in which the elements are associated so that adjustments of the same can be made without changing the axial relation of the bearings for the principal rotating parts.

Another object of my invention is to provide a double reduction axle with a bevel gear reduction ahead of a spur gear reduction, and in which the parts are so arranged that such an axle may be used singly to advantage, or where desired, a plurality of such axles receiving power from a motor through a common propeller shaft may suitably be coupled together for a multiple axle drive, as in so-called six wheel bus constructions.

Still another object of the invention is to provide a power transmitting mechanism which includes a differential mechanism for driving and connecting driving units, so that a pair of axles can be driven at variable speeds to allow for the irregularities of the road and the varying inflation of the tires in their tractive effort.

Other objects of the invention will be apparent to those skilled in the art to which my invention relates by reference to the accompanying drawings taken in connection with the following description:

Figure 1:
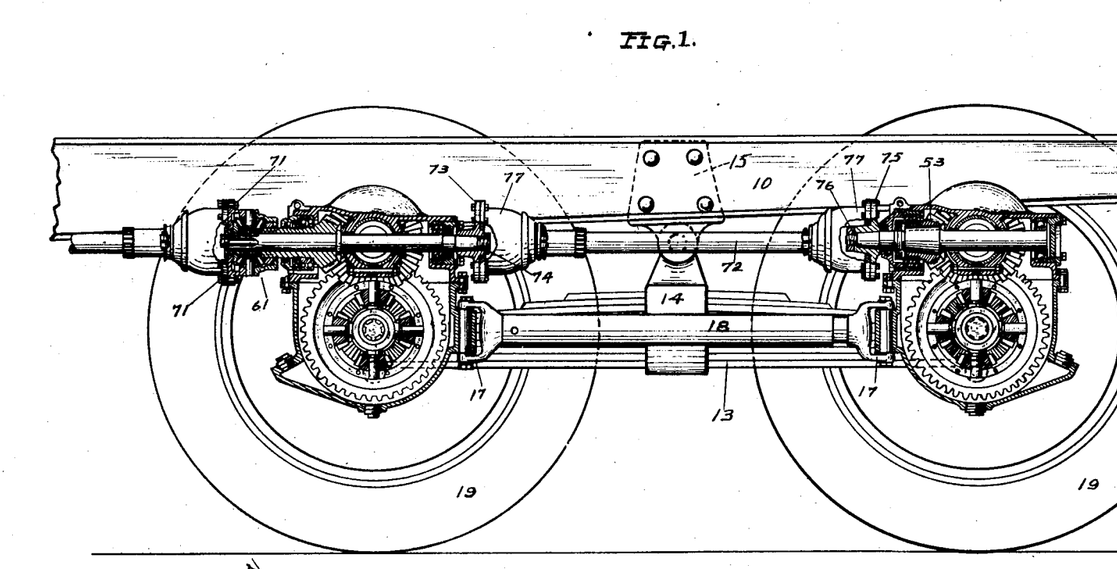
Figure 1 is a vertical sectional view, taken on line 1—1 of Fig. 2, showing an embodiment of invention attached to a fragmentary portion of a vehicle.
Figure 2:
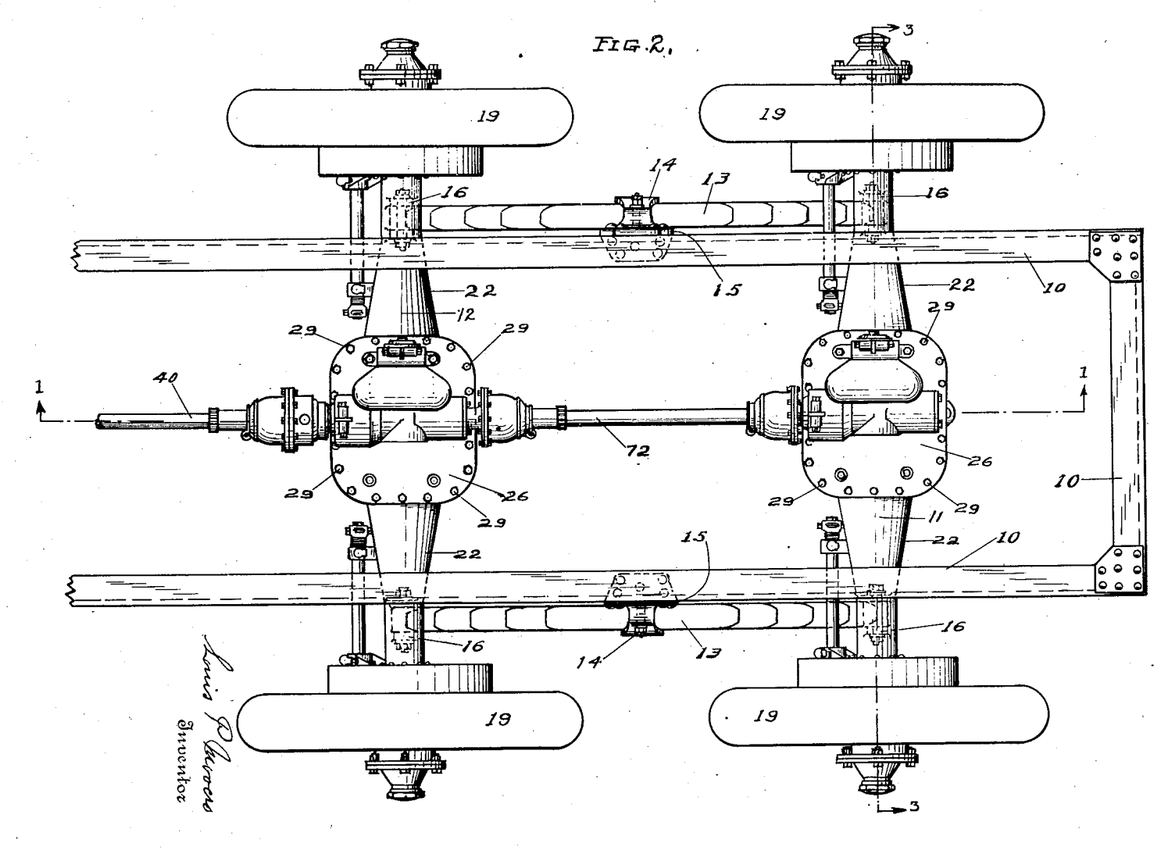
Fig. 2 is a plan view of my invention assembled with a portion of a motor vehicle.
Figure 3:
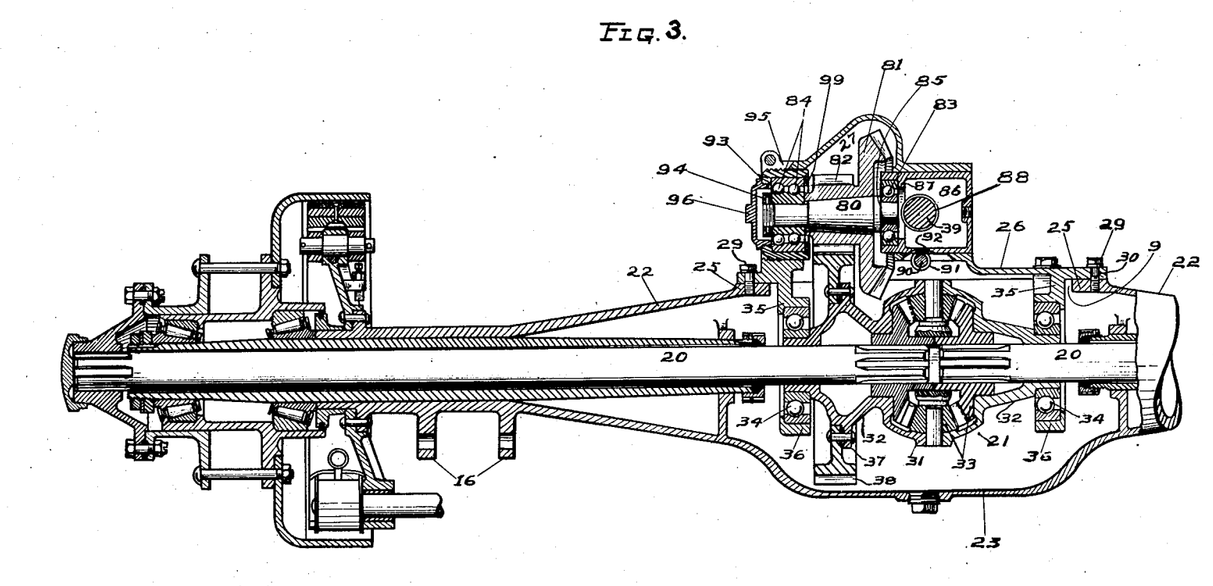
Fig. 3 is a medial sectional view of one of the driving axles and the power transmitting mechanism associated therewith, taken on line 3—3 of Fig. 2.
Figure 4:
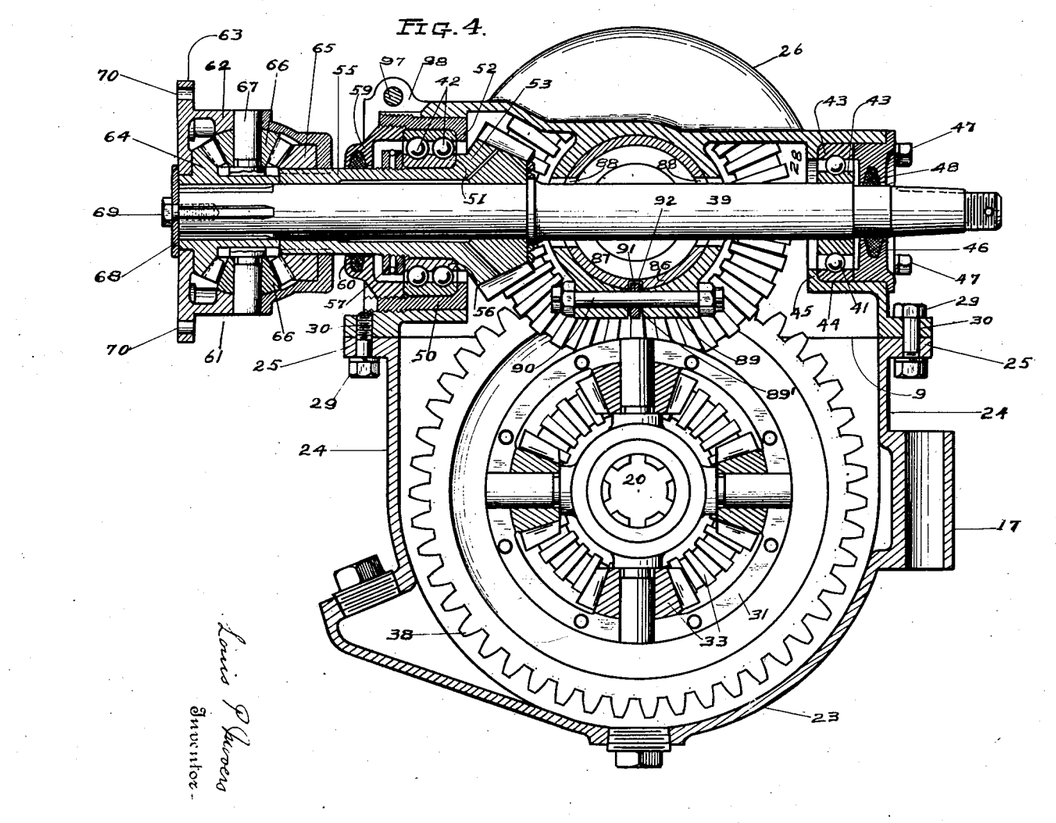
Fig. 4 is a vertical section of the forward unit assembly power transmitting mechanism taken longitudinally of the vehicle.
Figure 5:
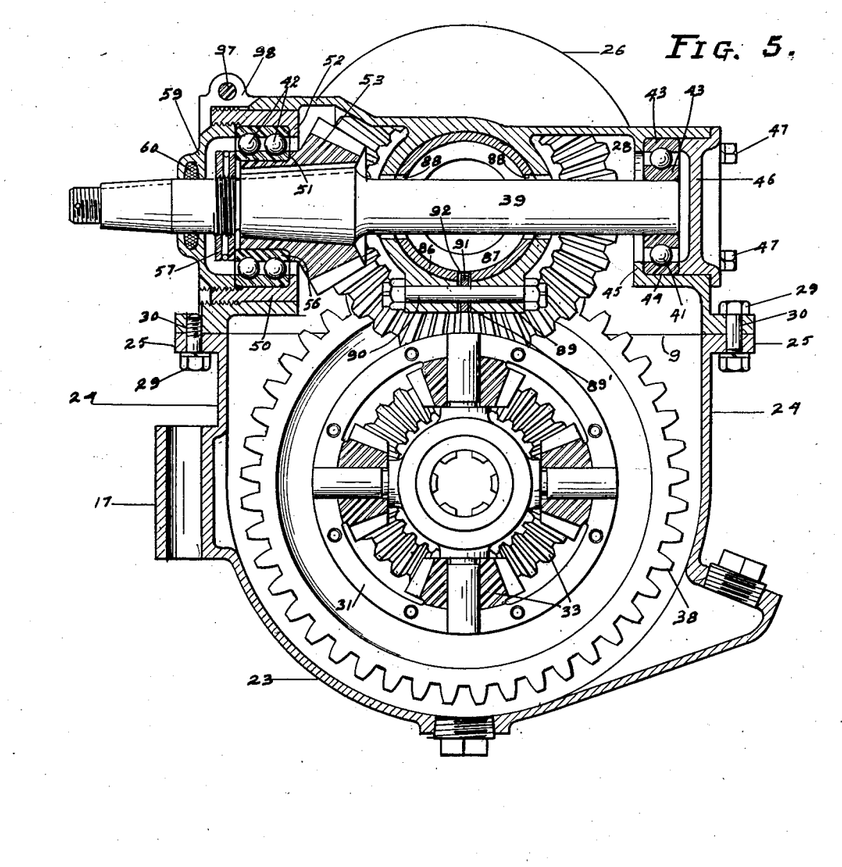
Fig. 5 is a similar view of the rear unit assembly power transmitting mechanism.

Referring to the drawings by characters of reference, 10 represents the rails forming the main frame of a motor propelled vehicle. A pair of axle housings 11 and 12 are arranged in parallel relation, transversely beneath the rear portion of the main frame and are connected by leaf springs 13 which extend therebetween, longitudinally with the side sills of the frame. The springs are carried centrally in stirrups 14 which are pivotally connected to the depending portions of brackets 15 secured to the side rails, and the ends of the springs are pivotally connected to the brackets 16 which are formed integral with and project from the lower side of the housings 11 and 12. The inner central portions of the housings are formed with brackets 17 with which opposite ends of a radius rod 18 are pivoted to permit lateral relative movement of the housings about the points of their pivoted longitudinal connections.

The pair of housings 11 and 12 are of similar design, and are arranged to carry similar driven axle structures by means of which power is transmitted to the wheels 19 arranged at the ends thereof. The axles are each formed of two sections 20, which are connected at their inner ends by differential gear mechanisms, referred to in their entirety as 21. The housings 11 and 12 are preferably formed as integral castings having tubular end portions 22 and a central portion 23 intermediate the end portions. The central portions of the housings are enlarged and are each provided with side walls 24 which form enlarged sections for housing the differential mechanisms 21 associated with each axle. The walls 24 and the tubular sections 22 are each formed to provide a relatively large opening 9, and the upper edges thereof surrounding the openings provide flanges 25 upon which seats the carriers 26, supporting the power transmitting assemblies for each axle, are secured.

The carriers 26 are similar in design and each is preferably constructed as a single casting shaped to fit over and enclose the openings 9, when assembled with the housings. Certain elements of the power transmitting mechanisms are supported within the carriers for association with the differential mechanisms of the axles, and are enclosed by the association of the carriers with the housings. The walls of the carriers 26 are shaped to provide chambers 27 and 28, preferably arranged at right angles to each other, to receive certain of the power transmitting mechanisms which will be hereinafter described. The carriers are removably secured against the flanges 25 of the housings by bolts and cap screws 29, or similar means, which extend through aligned apertures 30 provided for such purpose.

The differential mechanism 21, associated with each axle, consists of a cage 31 provided with end hub portions 32, and differential gears 33 which are carried within the cages and associated with the ends of the axle sections 20 in the conventional manner. The differential mechanisms are supported within the housings by ball bearing assemblies 34 which surround the end portions of the cage hubs, and are secured in the carriers by removable caps 36 which are bolted to spaced supports 35, depending from the carriers within the open central section of the housings. One of the hubs of each differential cage is provided with an annular flange 37 adjacent one of the bearings, to which a spur gear 38 is secured for driving the differential mechanisms.

A pinion shaft section 39 extends through each of the chambers 28 in the carrier castings 26, and such shaft sections are arranged to align with the propeller shaft section 40 which extends longitudinally of the vehicle from a motor (not shown). The pinion shaft sections 39 are supported adjacent one end by anti-friction load bearings 41, and adjacent their other end by a two row bearing 42, preferably adapted to take thrusts in opposite directions. The load bearings 41 include a pair of annular race members 43, the outer members of which are slidable axially into the annular seats 44 formed in the walls forming one end of the chambers 28. Each chamber is provided with an inner flange 45 adjacent the seat 44 against which the inner end of the outer race member 43 of each bearing assembly is held by a cap 46, which is secured to the chamber walls by cap screws 47. The caps 46 will maintain the bearings 41 in proper position, and a suitable gasket 48 is carried within a channel in the bearing edge of the cap 46 of the forward assembly to prevent escape of oil and the entrance of dust. In the rear assembly the shaft section 39 is not shown as extending through the cap 46, but the same arrangement can be made for the shaft to project through the cap as is provided in the forward assembly, if desired.

The forward ends of the pinion shaft sections 39 each extend through an aperture in the front wall of the chambers 28, and a hollow cylindrical member 50 is snugly seated in the aperture forming a seat in each chamber for supporting the two row thrust ball bearings 42. Seat members 50 are carried within the seats in the front chamber walls and are formed with inwardly extending annular flanges 52 which provide shoulders against which the outer races of the bearings 42 engage, while the other ends thereof are threaded exteriorly and are screwed into the internally threaded walls forming the seats. The seats for the bearings 41 and 42 in each unit are located so that they are in a vertical plane in advance of the driven axle 20 and the countershaft 80. The seat members 50 can be screwed in the ends of the seats in the chambers to adjust the bevel pinion 53 without disturbing the axial relation of either of the bearings 41 and 42. A bevel pinion 53 is carried upon each of the pinion shaft sections 39, within the chambers 28, and such pinions are provided with a laterally extending hub portion 55, preferably formed integral therewith, which carry the shaft sections 39 therein and extend through the bearings 42. The bevel pinion 53 associated with the forward carrier is loosely mounted upon the shaft section extending therethrough, while the bevel pinion 53 associated with the rear carrier is keyed to the shaft section extending therethrough. The inner races for the ball bearings 42 are preferably formed as collars 56, and such collars surround the pinion hubs 55, and abut at one end against the shoulders 51 formed intermediate the pinions 53 and their hubs. The collars 56 are held in position against the shoulders 51 by nuts 57; in the forward assembly the nut is screwed on a threaded portion of the pinion hub 55, and in the rear assembly the nut is threaded upon a threaded portion of the associated pinion shaft section 39, the nuts in both instances being screwed against the outer ends of the collars 56. Abutment members 59, having exterior threads, are screwed into the interiorly threaded outer ends of the seat members 50 and engage with the outer end of the exterior bearing races. The abutment members may be constructed to entirely close the space between the collars 56 and the pinion shaft of the rear assembly and the pinion hub 55 of the forward assembly, to protect the bearings 42 from dust and to prevent the escape of oil. For this purpose, the abutment members are recessed to receive the gaskets 60. The carrier castings are slotted above the seating members 50, and a bolt 97 is provided to clamp the free ends together around the seating members. A key 98 is carried on the bolts 97 intermediate the free ends of the carriers formed by the slot and they engage grooves in the ends of the carriers and seating member to prevent rotation of the seating members while adjusted, it being understood that the keys are removed during adjustment.

Road conditions, and the variations in the inflation of the tires on the wheels associated with the driving axles, will cause excessive wearing of the tires and unnecessary strains upon the driving mechanism for the axles when the mechanisms are directly and positively connected together and to a source of power so as to be rotated together at the same speed. To obviate such conditions, I provide a differential mechanism which is associated with the motor driven propeller shaft section 40 and arranged to drive both axles therefrom, thereby permitting the shafts 39 of the coupled axles to rotate at different speeds when conditions demand. To provide a compact, light structure which can be manufactured at a low cost, and which will be rugged, I associate such differential mechanism concentrically with the aligned propeller shaft 40 and pinion shaft 39.

The pinion hub 55 of the front driving assembly, the shaft section 39 carried thereby, and the differential mechanism unit, referred to in its entirety as 61, are associated as a unitary structure. A differential carrying cage 62 extends concentrically around the end portions of the pinion hub 55 and the shaft section 39 projecting from and carried thereby, and an end flange 63 is formed integrally with such cage. A bevel differential pinion 64 is keyed slidably to the end portion of such pinion shaft section, and a similar differential bevel pinion 65 is keyed slidably upon the end of the pinion hub 55, the pinions 64 and 65 being rotatably carried in spaced relation within the cage. Bevel pinions 66 are carried intermediate the gears 64 and 65, in mesh therewith, and are rotatably supported and attached within the cage by pin shafts 67. The differential mechanism above described is associated as a unit structure and can be removed and attached as such. A washer 68 is provided to secure the differential mechanism unit with the front driving assembly, and a cap screw 69 is screwed through the washer 68 and into an axially extending aperture in the front end of the forward stub pinion shaft section 39. The flange portion 63 of the cage is provided with apertures 70 through which securing means, such as bolts 71, extend to secure the rear end of the main propeller shaft 40 therewith. By removing the cap screw 69 from the front shaft section 39, the differential 61 can be removed as a unit from the associated mechanism in the assembly. The bearing seat members 50 can be adjusted lengthwise relative, from the exterior of the carriers, to properly position the bevel pinions 53 within the front of the chambers 28, and as the bearings 42 and the pinion shaft sections 39 are bodily carried thereby, such adjustment will not effect any change in their relative association. It will be seen that the shafts 39 and pinions 53 can thus be adjusted from the exterior of the carriers without effecting any misalignment or change in the axial relation of the bearings. The seats formed in the carrier chambers 28 are in axial alignment and the axial relation of the bearings 41 and 42 will not be changed when the longitudinal position of the bearings 42 is changed through adjustment of the seat members 50.

A shaft section 72 connects the rear end of the forward pinion shaft section 39 with the forward end of the rear pinion shaft section 39. A flange 73 is provided with a hub portion which is keyed to the rear end of the forward pinion shaft section, and a nut 74 is screwed upon the threaded end of such pinion shaft section to prevent longitudinal displacement of the flange. A flange 75 is provided with a hub portion which is keyed upon the forward end of the rear pinion shaft section, and a nut 76 is screwed upon the threaded end of such shaft to prevent longitudinal displacement of the flange. Universal joints 77 are interposed between and secured to the ends of the shaft section 72 and the flanges 75 and 73, thus providing a driving connection between the forward pinion shaft section 39 and the rear pinion shaft section 39. The universal joints can be readily secured to, or removed from, the plates 73 and 75 when desired. It will be seen that power is transmitted, from the motor to the differential mechanism unit 61, by the main propeller shaft 40, and that such differential mechanism provides a differential drive for each of the axle driving mechanisms. The forward axle is driven by the loosely mounted pinion 53 on the forward pinion shaft section 39 through the gear 65, and the rear axle is driven by the pinion 53 keyed to the rear pinion shaft section 39 which is driven through the gear 64 through the forward pinion shaft section and the shaft section 72. In this manner the driven parts of the two axles can be driven and can rotate at different speed ratios without causing strains upon the respective driving mechanisms which are present when no differential is provided between them.

The pinion shaft sections 39 are assembled with their carriers, so that they form a part of the driving unit for each axle, and they can be attached, or removed from the carriers either when the carriers are attached, or when the carriers are removed from the axle housings. The shaft section 39 in the forward unit can be removed from either end of the carrier and when it is desired to remove it from the rear end of the carrier, the cap screws 47 and 69 are removed, permitting the shaft to be moved endwise from the differential 61, the bevel pinion 53 and the carrier, which remain stationary, while the bearing 41 and the bearing caps 46 will be carried therewith. The shaft section 39 is not removable from the rear driving unit through the rear wall of the chamber 28. The shaft sections 39 are both removable from the forward ends of the chambers 28 and in such operation it is only necessary to remove the keys 98 and unscrew the seating members 50. The bearing 42, pinion 53, and differential mechanism 61 will be removed with the associated seating member when the shaft associated therewith is moved lengthwise from the bearing 41, and through the seats in the chambers 28.

Mechanism for transmitting power from the pinions 53 to the gears 38 at a double reduction of speed is provided within each of the carriers and forms a part of the unitary assemblies. For this purpose, a countershaft 80 extends at right angles to the pinion shaft in each assembly, and across the chamber 27 in each carrier. A bevel gear 81 is arranged to mesh with the bevel pinions 53 in each assembly, while a spur gear 82 is arranged to mesh with the differential spur gears 38 of each assembly. The gears 81 and 82 are preferably formed integral, and are keyed to the shafts 80. The opposite ends of the shafts 80 are supported in suitable anti-friction bearings 83 and 84 mounted within axially aligned seats formed within the walls of the chambers 27 and opening therethrough. The bearings are arranged at or in close proximity to the open ends of the seats so that the bearings can be assembled and adjusted through the exterior of the carriers.

The bearing 83 is a load bearing. The inner edge of the interior race of such bearing fits against a shoulder 85 on the shaft 80, and the outer race fits within one end of a cylindrical bearing sleeve 86, and abuts at its outer end against a flange 87 extending interiorly of the bearing sleeve. The sleeves 86 are closed at their exterior ends and fit snugly within their seats in the wall of the casing forming the chambers 27. The pinion shaft sections 39 of each assembly extend through apertures 88 provided in the wall of the sleeve bearings 86. The lower wall 89, forming the seats for the sleeves 86, are split at 89' and the free ends thereof are clamped together by a bolt 90 to secure the sleeve bearings in desired longitudinal position. A key 91 is carried on each of the bolts 90 and extends between the walls of the split 89' and engages with the walls of a groove 92 formed in the adjacent sleeve 86 to prevent rotation thereof, such arrangement permitting the bearing sleeves to be moved lengthwise for adjustment without danger of rotary displacement.

The other ends of the shafts 80 are carried by a two row bearings 84 which take both loads and thrust, and the thrusts in both directions endwise of the shaft are overcome. A seat member 93, having an inturned inner flange at its outer end, is threaded externally and screwed into the threaded walls forming the aperture at one of the ends of the chambers 27. The flanged ends of the seat members 93 form a shoulder against which the outer end of the outer bearing races engage, and the inner races of the bearings engage the gear 82, at their inner end. A nut 99 is screwed into the threaded inner wall of each of the seat members 93 and engages the inner end of the outer race. The shaft 80 extends through the inner race of each assembly, and the projecting end is threaded to receive a nut 94 which is screwed thereon into engagement with the outer end of the inner race. By screwing the seat members lengthwise, the entire bearing therein and the shaft 80 will be moved axially, and in this manner the gears 81 which are keyed to the shafts 80 can be adjusted relative to the bevel pinions 53. Suitable means 95, such as a pivoted key, may be employed to secure the bearing sleeves to the carriers and prevent their rotation when in desired lengthwise relative position. A closure cap 96 is screwed into the threaded outer end of the sleeve members 86 so as to enclose the bearing and the shaft adjacent thereto, and will thus prevent dust from entering therein and oil escaping therefrom. It will be seen that the seating members 93 can be adjusted from the exterior of the carriers to position the gears 81, and that the axial relation of the bearings 83 and 84 to the shaft 80 will not be disturbed by such adjustment. It will also be seen that the bearings 84 can be adjusted from the exterior of the carriers by moving the elements 86, and that both bearings can be assembled from the exterior of the carriers.

From the foregoing description, it will be seen that I have provided a simple, compact driving mechanism for a pair of axles which receive power from a common differential mechanism, and with the propeller shaft, the pinion shafts and the shaft connecting the pinion shafts, arranged for a straight line drive. It will also be seen that such mechanism is constructed of a minimum number of essential elements which are arranged effectively to withstand the strains and thrusts to which they may be subjected, and that driving mechanism for each axle is associated with differential mechanism to permit the axles to rotate at different speeds, when conditions demand it, thereby eliminating wear on the tires and the driving mechanism which would be caused if the axles were driven at the same speed of rotation from a common source.

It will be seen that the power transmitting mechanism for the two axles comprises unitary assemblies which can be readily attached or removed from the axle housings in manufacture and servicing. Each unit structure consists of an integrally formed carrier, differential mechanism for the driven axle sections, shafts 39 and 80, gearings 53, 81 and 82, and the bearings for the shafts. The forward unit also includes the driving differential 61 which is removably secured therewith as a unitary structure, and can be so removed. The differential unit 61 is removably secured to the motor driven shaft section 40, and the shaft sections 39 of the unit assemblies are connected by the removable shaft section 72. It will be seen that the pinion shaft sections 39 can be adjusted from the exterior of the carriers, either when attached or detached, to move the bevel pinions 53 relative to the gears 81, and that both of such shaft sections can be removed from one end of the chambers 28 in the carriers, and that the forward shaft section 39 can be removed from either end of the chamber through which it extends. It will also be seen that the shafts 80 are adjustable from the exterior of the carriers to position the gears 81 and 82, and that the adjustment of the shafts 39 and 80 will not affect the axial alignment of the supporting bearings.

It will be understood that having in mind the problems involved in the manufacture of an axle for heavy duty purposes including the cost of tools and maintenance thereof, I have conceived a new combination of the parts which enables the manufacturer to produce from substantially the same tools a highly efficient and economical double reduction axle or single axle drive in which final reduction is through spur gears and the first reduction through bevel gears affording the most efficient relation of such gearing for work of this character. If the manufacturer's demand is for single drive axles, he can use one of my improved axles for that purpose, whereas if multiple axle drive is required, as, for example, on so-called six-wheel busses, he may readily couple up two of my axles through a common propeller shaft in the most efficient and economical manner, the only difference between the two axles, besides details of construction of the bevel pinions, being that the bevel pinion shaft of one is elongated and extended through a suitable end plate to provide for a connection in alignment with the front end of the corresponding bevel pinion shaft to which it is to be connected on the other axle.

It will further be noted that in my improved axle whether or not it is used singly or in pairs, the bevel pinion shaft of each axle is suitably mounted on antifriction bearings near either end of the shaft at the front and rear of the axle housing and on opposite sides of the axis of the bevel gear countershaft.

It will be understood that this axle may be run with either the spur gears down as shown in the drawings or with the bevel gears down by inverting the axle, thereby getting greater floor clearance. Furthermore, when desired, the axis of the countershaft may be set forward or rearward of the vertical plane of the axis, as shown in the drawings, of the driven shaft sections, the mere rearrangement of the housing structure being required for such purposes and a more compact axle in vertical dimensions being thus obtained.

In each driving assembly, the heavy load is taken by the spur gears 38 and 82, while the lighter load is taken by the bevel gears 53 and 81. This arrangement of the gears has the advantage of providing a simple, compact construction in which there are no complications, and which has strength and can be assembled in very little space above the axle housings. The differential mechanism 61 forms a part of the front unit and is external of the carrier so that it is readily accessible, and it is supported mainly by the elongated hub 55 of the pinion 53 so that the overhang is not detrimental to the strength of the assembly.

It will be seen that I have provided power transmitting assemblies in which the elements, including double reduction gearing, are arranged in a novel manner and without complication, so that very little space is required adjacent the axles to accommodate them. The pinion shaft sections are arranged to extend in longitudinal alignment with the main propeller shaft, and the countershaft in each unit extends in the same horizontal plane with the propeller shaft section. The countershafts extend at right angles to the pinion shaft sections and at one side thereof so that their ends, adjacent the propeller shaft sections, can carry the bevel gears in mesh with the bevel pinions on the propeller shaft sections. The spur gears on the countershafts are removed from the bevel pinions and mesh with the spur gears on the axle differential, which are offset from the pinion cage. With this arrangement of the shafts and gears the power can be transmitted at a double reduction in speed without utilizing much space adjacent the axles and without complication of the elements in the mechanisms.

The power transmitting mechanism above described consists of comparatively few parts which are associated effectively to provide a double reduction drive for a pair of axles, and the friction losses are of the minimum. The simplicity of the assemblies and their adjustability and removability from the exterior of the carriers, permit the mechanism to be cheaply manufactured and serviced.

To those skilled in the art to which this invention relates, many alterations in construction and widely differing embodiments and applications of my invention will suggest themselves without departing from the spirit and scope thereof. My disclosures and description herein are purely illustrative and are not intended to be in any sense limiting.

What I claim is:

1. In a motor vehicle, the combination with an axle housing having a gear receiving portion provided with a horizontally disposed opening, a chambered carrier of a width corresponding substantially to the width of said housing, said carrier being removably secured to the housing over said opening and forming a closure therefor, axially alined axle sections in said housing, differential gearing through which the axle sections are driven, said gearing being within the gear receiving portion of the housing and including a rotatable gear cage, a horizontal propeller shaft journaled in said carrier and extending across the opening adjacent thereto in a direction transverse to the axle, a countershaft journaled in said carrier and positioned in the vertical plane of the axle and the horizontal plane of the propeller shaft, intermeshing bevel gears on the propeller shaft and countershaft, intermeshing spur gears on the countershaft and gear cage, bearings in the carrier for the propeller shaft on opposite sides of the bevel gear thereon, bearings in the carrier for the opposite ends of the countershaft, and axially adjustable carriers for the last mentioned bearings, one of said carriers having openings through which the propeller shaft extends.

2. In a motor vehicle drive, in combination with an axle housing having axially alined axle sections mounted therein with their inner ends adjoining midway between the ends of the housing, a differential including a rotatable gear cage having an enlarged gear carrying portion around the adjoining ends of the axle sections, said cage having a spur ring gear attached thereto laterally of said enlarged portion, a propeller shaft extending across the axle housing centrally thereof and at right angles thereto, and a double reduction gearing interposed between the propeller shaft and said cage, said gearing comprising a bevel gear on the propeller shaft, a large bevel gear meshing with the bevel gear on the propeller shaft and a small spur gear meshing with the laterally offset ring gear on the cage, said large bevel gear and small spur gear being mounted side by side for unitary rotation about an axis at right angles to the propeller shaft with the large bevel gear disposed between the small spur gear and the propeller shaft and projecting into the space between the spur gear and enlarged gear carrying portion of the cage.

3. In a motor vehicle drive, in combination with an axle housing having axially alined axle sections mounted therein with their inner ends adjoining midway between the ends of the housing, a differential including a rotatable gear cage having an enlarged gear carrying portion around the adjoining ends of the axle sections, said cage having a spur ring gear attached thereto laterally of said enlarged portion, a propeller shaft extending across the axle housing centrally thereof and at right angles thereto, and a double reduction gearing interposed between the propeller shaft and said cage, said gearing comprising a countershaft to one side of the propeller shaft and at right angles thereto, supports for the ends of said countershaft, a small spur gear and a large bevel gear mounted side by side on the countershaft between said supports for rotation in unison, the small spur gear meshing with the spur ring gear on the cage and the bevel gear being disposed between the small spur gear and the propeller shaft and projecting into the space between the spur ring gear and the enlarged portion of the gear cage, and a bevel gear on the propeller shaft meshing with said large bevel gear.

4. In a motor vehicle drive, in combination with an axle housing having a central enlarged gear housing portion, axially alined axle sections mounted in the housing and having their inner ends adjoining midway between the ends of the housing, a differential gearing connecting the adjoining ends of the axle sections, a rotatable cage for the differential gearing having journaled hub portions and an enlarged portion within which the differential gearing is mounted, a large spur gear secured to the cage laterally of said enlarged portion thereof, a countershaft parallel with the axis of the axle sections and laterally offset with respect to the differential gearing, supports carried by the housing for opposite ends of the countershaft, a small spur gear and a large bevel gear mounted side by side on the countershaft between said supports for rotation in unison, the small spur gear meshing with the large spur gear on the cage and the large bevel gear extending between the large spur gear and the enlarged portion of the gear cage, a propeller shaft extending through the enlarged portion of the axle housing at right angles thereto centrally of the differential gearing, said shaft extending across the inner end of the laterally offset countershaft in the plane thereof and through the support for the inner end of said countershaft, and a bevel gear on the propeller shaft meshing with the bevel gear on the countershaft.

5. In a motor vehicle drive, in combination with an axle housing having an enlarged gear enclosing and lubricant receiving chamber and axially alined axle sections the inner ends of which adjoin within said chamber, a differential interposed between said axle sections including a rotatable gear cage having an enlarged gear carrying portion around the adjoining ends of said axle sections, said cage having a spur ring gear attached thereto and spaced laterally from said enlarged portion, a propeller shaft extending through said chamber in the vertical plane of the enlarged portion of the gear cage and at right angles to the axle sections, and a double reduction gearing interposed between said propeller shaft and gear cage which comprises a spur and a bevel gear mounted laterally of the propeller shaft to rotate in unison about an axis at right angles to the propeller shaft and a bevel gear on the propeller shaft, said bevel gears being intermeshed and said spur gears being intermeshed, all of the gears of the double reduction gearing being within said lubricant receiving chamber.

6. In a tandem drive for motor vehicles, a plurality of parallel axle assemblies, each including an axle housing having axially alined axle sections, a differential having driving gears interposed between the adjoining ends of the axle sections, and a spur ring gear offset laterally with respect to the driving gears, each axle housing having a substantially horizontally disposed opening to receive the axle differential, covers for said openings, a sectional propeller shaft extending in the central plane of the axle differentials at right angles to the axles, said propeller shaft comprising a driving section mounted in each axle housing cover and sections flexibly joined thereto, and a double reduction gearing interposed between each driving section and the axle differential associated therewith, each double reduction gearing being mounted wholly to one side of the propeller shaft and including a small spur gear meshing with the ring gear, a bevel gear of a size greater than the spur gear mounted coaxially alongside the small spur gear to rotate in unison therewith, and a bevel gear on the driving section of the propeller shaft meshing with the large bevel gear, the spur gear and large bevel gear of each double reduction gearing being mounted in a cover.

7. In a tandem drive for motor vehihcles, a plurality of parallel axle assemblies, each including an axle housing having axially alined axle sections, a differential having driving gears interposed between the adjoining ends of the axle sections, and a spur ring gear offset laterally with respect to the driving gears, each axle housing having a substantially horizontally disposed opening to receive the axle differential, covers for said openings, a sectional propeller shaft extending in the central plane of the axle differentials at right angles to the axles, said propeller shaft comprising a driving section mounted in each axle housing cover and sections flexibly joined thereto, a differential interposed between successive driving sections of the propeller shaft, and a double reduction gearing interposed between each driving section and the axle differential associated therewith, each double reduction gearing being mounted wholly to one side of the propeller shaft and including a small spur gear meshing with the ring gear, a bevel gear of a size greater than the spur gear mounted coaxially alongside the small spur gear to rotate in unison therewith, and a bevel gear on the driving section of the propeller shaft meshing with the large bevel gear, the spur gear and large bevel gear of such double reduction gearing being mounted in a cover.

In testimony whereof I have hereunto affixed my signature.

LOUIS P. MOOERS.